US011341704B1

(12) United States Patent
Lozada et al.

(10) Patent No.: US 11,341,704 B1
(45) Date of Patent: May 24, 2022

(54) TOOL APPLICATION TO A SKELETON OF A GRAPHICAL OBJECT

(71) Applicant: Apple Inc., Cupertino, CA (US)

(72) Inventors: Richard Ignatius Punsal Lozada, Cupertino, CA (US); James Graham McCarter, Erie, CO (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/148,803

(22) Filed: Jan. 14, 2021

Related U.S. Application Data

(60) Provisional application No. 62/983,130, filed on Feb. 28, 2020.

(51) Int. Cl.
*G06T 13/40* (2011.01)
*G06T 19/20* (2011.01)
*G06T 19/00* (2011.01)

(52) U.S. Cl.
CPC .............. *G06T 13/40* (2013.01); *G06T 19/20* (2013.01); *G06T 19/006* (2013.01)

(58) Field of Classification Search
None
See application file for complete search history.

(56) References Cited

U.S. PATENT DOCUMENTS

| 2008/0309664 | A1  | 12/2008 | Zhou et al. | |
| 2010/0134490 | A1  | 6/2010 | Corazza et al. | |
| 2012/0139899 | A1  | 6/2012 | Winchester | |
| 2012/0229475 | A1* | 9/2012 | Sheridan ................ | G06T 13/40 345/474 |
| 2014/0113720 | A1* | 4/2014 | Borge .................... | A63F 13/00 463/31 |

OTHER PUBLICATIONS

Huang, Jing, and Catherine Pelachaud. "Expressive body animation pipeline for virtual agent." International Conference on Intelligent Virtual Agents. Springer, Berlin, Heidelberg, 2012. (Year: 2012).*

* cited by examiner

*Primary Examiner* — Vu Nguyen
(74) *Attorney, Agent, or Firm* — Fernando & Partners, LLP (57) ABSTRACT

Various implementations disclosed herein include devices, systems, and methods for selectively applying a tool and/or a rig to a skeleton of an object based on an upcoming motion. In some implementations, a method includes obtaining, from a memory location, a response characteristic to be exhibited by an object while displaying the object in a computer graphics environment. A tool is selected that allows the object to be manipulated to exhibit the response characteristic in the computer graphics environment. The tool is associated with a skeleton of the object. A manipulation of the object is displayed within the computer graphics environment in accordance with the response characteristic after associating the tool with the skeleton of the object.

24 Claims, 7 Drawing Sheets

```
┌─────────────────────────────────────────────────────────────────┐
│ While displaying object in environment, obtain from memory      │
│ location response characteristic to be exhibited by object      │──410
└─────────────────────────────────────────────────────────────────┘
                                │
                                ▼
┌─────────────────────────────────────────────────────────────────┐
│ Select tool that allows object to be manipulated to exhibit     │
│ response characteristic in environment                          │──420
└─────────────────────────────────────────────────────────────────┘
                                │
                                ▼
┌─────────────────────────────────────────────────────────────────┐
│ Associate tool with skeleton of object                          │──430
└─────────────────────────────────────────────────────────────────┘
                                │
                                ▼
┌─────────────────────────────────────────────────────────────────┐
│ Display manipulation of object within environment in accordance │
│ with response characteristic after associating tool with        │──440
│ skeleton of object                                              │
└─────────────────────────────────────────────────────────────────┘
```

TOOL APPLICATION TO A SKELETON OF A GRAPHICAL OBJECT

CROSS-REFERENCE TO RELATED APPLICATION

This application claims the benefit of U.S. Provisional Patent App. No. 62/983,130, filed on Feb. 28, 2020, which is incorporated by reference in its entirety.

TECHNICAL FIELD

The present disclosure generally relates to tool application to a skeleton of an object.

BACKGROUND

Some devices are capable of generating and presenting objects in graphical environments. Tools may enable certain manipulations of these objects, but are limited in their range of available manipulations.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for selectively applying a tool to a skeleton of an object based on an upcoming motion. In some implementations, a method includes obtaining, from a memory location, a response characteristic to be exhibited by an object while displaying the object in a computer graphics environment. A tool is selected that allows the object to be manipulated to exhibit the response characteristic in the computer graphics environment. The tool is associated with a skeleton of the object. A manipulation of the object is displayed within the computer graphics environment in accordance with the response characteristic after associating the tool with the skeleton of the object.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands).

A person may sense and/or interact with an XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The present disclosure provides methods, systems, and/or devices for selectively applying a tool to a skeleton of a graphical object ("object", hereinafter for the sake of brevity) such as an extended reality (XR) object based on an upcoming motion. In some implementations, the number of potential motions that the XR object may be manipulated to perform may be increased. In some implementations, a tool may be disengaged from the skeleton of the XR object. For example, if an upcoming motion includes jumping or flying, a gravity tool may be disengaged from the skeleton of the XR object so that the XR object can be animated to exhibit the jumping or flying motion.

In some implementations, the skeleton of the XR object may remain fixed. An emergent content engine may generate objectives based on skeletal features. Tools may be selectively applied to the skeleton of the XR object to increase the probability of satisfying an objective and/or performing an action.

Various examples of electronic systems and techniques for using such systems in relation to various enhanced reality technologies are described.

In various implementations, a device directs an XR object to perform one or more actions in order to effectuate (e.g., advance, satisfy, complete, and/or achieve) one or more objectives (e.g., results and/or goals). In some implementations, the XR object is associated with a particular objective, and the XR object performs actions that improve the likelihood of effectuating that particular objective.

In some implementations, an XR object performs a sequence of actions. In some implementations, a device determines (e.g., generates and/or synthesizes) the actions for the XR object. In some implementations, the actions generated for the XR object are within a degree of similarity to actions that a corresponding entity (e.g., a character, an equipment, and/or a thing) performs as described in fictional material or as exists in a physical environment. For example, in some implementations, an XR object that corresponds to a fictional action figure performs the action of flying in an XR environment because the corresponding fictional action figure flies as described in the fictional material. Similarly, in some implementations, an XR object that corresponds to a physical drone performs the action of hovering in an XR environment because the corresponding physical drone hovers in a physical environment. In some implementations, the device obtains the actions for the XR object. For example, in some implementations, the device receives the actions for the XR object from a separate device (e.g., a remote server) that determines the actions.

In some implementations, an XR object corresponding to a character is referred to as an XR character, and an objective of the XR character is referred to as a character objective. In such implementations, the XR character performs actions in order to effectuate the character objective.

In some implementations, an XR object corresponding to equipment (e.g., a rope for climbing, an airplane for flying, a pair of scissors for cutting) is referred to as an XR equipment, and an objective of the XR equipment is referred to as an equipment objective. In such implementations, the XR equipment performs actions in order to effectuate the equipment objective.

In some implementations, an XR object corresponding to an environment (e.g., weather pattern, features of nature and/or gravity level) is referred to as an XR environment, and an objective of the XR environment is referred to as an environmental objective.

In some implementations, an XR object includes a skeleton. The skeleton includes one or more members connected to one another by joints. An XR object may be manipulated to perform actions, e.g., by manipulating the skeleton of the XR object. The XR object may also include a mesh or a skin that is associated with the skeleton.

A tool may facilitate manipulation of an XR object. For example, a motion controller controls various joints of an XR object. A motion controller may provide motion for a specific animation. As such, each animation may use a dedicated motion controller that generates motion for that particular animation. For example, a running animation may use a running motion controller that generates motion data for the running animation. Similarly, a jumping animation may use a jumping motion controller that generates motion data for the jumping animation. Alternatively, in some implementations, a single motion controller (e.g., a universal motion controller) may provide motion for various animations.

A tool may be applied to the skeleton of an object, for example, when the skeleton is created. Applying a tool to the skeleton during creation of the skeleton may limit the range of animations that an XR object can undergo. For example, if a gravity tool (e.g., a tool that enables an XR object to be subjected to the effects of gravity in an XR environment) is applied when the skeleton is created, the XR object may be unable to undergo animations that appear to defy gravity, such as flying or levitating.

The present disclosure provides methods, systems, and/or devices in which a tool is selectively applied to a skeleton of an XR object. Selectively applying a tool to a skeleton of an XR object and/or disengaging a tool from an XR object based on upcoming actions may increase the number of potential manipulations (e.g., animations) that the XR object can undergo. In some implementations, the tool is applied to the skeleton of the XR object based on an upcoming action. For example, a gravity tool may be applied to the skeleton to facilitate manipulating (e.g., animating) the XR object to undergo a walking animation, a running animation, or a falling animation. In some implementations, the tool is disengaged from the skeleton of the XR object based on an upcoming action. For example, a gravity tool may be disengaged from the skeleton to facilitate manipulating (e.g., animating) the XR object to undergo a jumping animation, a flying animation or a levitating animation.

In some implementations, an emergent content engine generates objectives based on skeletal features. The emergent content engine may select and/or apply one or more tools to the skeleton of the XR object to increase a likelihood of satisfying an objective and/or performing an action.

FIG. 1A is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and an electronic device 103. In the example of FIG. 1A, the electronic device 103 is being held by a user 10. In some implementations, the electronic device 103 includes a smartphone, a tablet, a laptop, or the like.

As illustrated in FIG. 1A, the electronic device 103 presents an extended reality (XR) environment 106. In some implementations, the XR environment 106 is generated by the controller 102 and/or the electronic device 103. In some implementations, the XR environment 106 includes a virtual environment that is a simulated replacement of a physical environment. In other words, in some implementations, the XR environment 106 is synthesized by the controller 102 and/or the electronic device 103. In such implementations, the XR environment 106 is different from a physical environment in which the electronic device 103 is located. In some implementations, the XR environment 106 includes an augmented environment that is a modified version of a physical environment. For example, in some implementations, the controller 102 and/or the electronic device 103 modify (e.g., augment) the physical environment in which the electronic device 103 is located to generate the XR environment 106. In some implementations, the controller 102 and/or the electronic device 103 generate the XR environment 106 by simulating a replica of the physical environment in which the electronic device 103 is located.

In some implementations, the controller 102 and/or the electronic device 103 generate the XR environment 106 by removing and/or adding items from the simulated replica of the physical environment in which the electronic device 103 is located. In some implementations, the XR environment 106 is referred to as a computer graphics environment or a graphical environment.

In some implementations, the XR environment 106 includes various XR objects that correspond to various characters and/or equipment, such as a boy action figure representation 108a, a girl action figure representation 108b, a robot representation 108c, and a drone representation 108d. In some implementations, the XR objects represent characters from fictional materials, such as movies, video games, comics, and novels. For example, the boy action figure representation 108a represents a boy action figure character from a fictional comic, and the girl action figure representation 108b represents a girl action figure character from a fictional video game. In some implementations, the XR environment 106 includes XR objects that represent characters from different fictional materials (e.g., from different movies, games, comics, and/or novels). In various implementations, the XR objects represent physical articles. For example, in some implementations, the XR objects represent equipment (e.g., machinery such as planes, tanks, robots, cars, etc.). In the example of FIG. 1A, the robot representation 108c represents a robot and the drone representation 108d represents a drone. In some implementations, the XR objects represent entities (e.g., equipment) from fictional materials. In some implementations, the XR objects represent entities from a physical environment, including things located inside and/or outside of the XR environment 106.

In various implementations, an XR object is manipulated to exhibit one or more actions that effectuate (e.g., complete, satisfy, and/or achieve) one or more objectives associated with the XR object. In some implementations, the XR object is manipulated to exhibit a sequence of actions. In some implementations, the controller 102 and/or the electronic device 103 determine the actions for the XR object. In some implementations, the actions of an XR object are within a degree of similarity to (e.g., within a similarity threshold of) actions that the corresponding entity (e.g., character, equipment or thing) performs in the fictional material. In the example of FIG. 1A, the girl action figure representation 108b is performing the action of flying (e.g., because the corresponding girl action figure character is capable of flying, and/or the girl action figure character frequently flies in the fictional materials). In the example of FIG. 1A, the drone representation 108d is performing the action of hovering (e.g., because drones in physical environments are capable of hovering). In some implementations, the controller 102 and/or the electronic device 103 obtain the actions for the XR objects. For example, in some implementations, the controller 102 and/or the electronic device 103 receive the actions for the XR objects from a remote server that determines (e.g., selects) the actions.

In some implementations, the XR environment 106 is generated based on a user input from the user 10. For example, in some implementations, the electronic device 103 receives a user input indicating a terrain for the XR environment 106. In such implementations, the controller 102 and/or the electronic device 103 configure the XR environment 106 such that the XR environment 106 includes the terrain indicated via the user input. In some implementations, the user input indicates environmental conditions for the XR environment 106. In such implementations, the controller 102 and/or the electronic device 103 configure the XR environment 106 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow). In some implementations, the user input specifies a time period for the XR environment 106. In such implementations, the controller 102 and/or the electronic device 103 maintain and present the XR environment 106 during the specified time period.

In some implementations, the controller 102 and/or the electronic device 103 determine (e.g., generate) actions for the XR objects based on a user input from the user 10. For example, in some implementations, the electronic device 103 receives a user input indicating placement of an XR object. In such implementations, the controller 102 and/or the electronic device 103 position the XR object in accordance with the placement indicated by the user input. In some implementations, the user input indicates specific actions that the XR object(s) are permitted to perform. In such implementations, the controller 102 and/or the electronic device 103 select the actions for the XR object(s) from the specific actions indicated by the user input. In some implementations, the controller 102 and/or the electronic device 103 forgo actions that are not among the specific actions indicated by the user input.

In various implementations, an animation defines a sequence of poses that collectively span a time duration. When an XR object adopts the various poses defined by an animation in a sequential manner, the XR object provides an appearance that the XR object is performing an action that is associated with the animation. For example, when the boy action figure representation 108a sequentially adopts poses defined by a walking animation, the boy action figure representation 108a provides an appearance that the boy action figure representation 108a is walking.

In some implementations, the controller 102 and/or the electronic device 103 include various tools 110 (e.g., a first tool 110-1, a second tool 110-2, . . . , and an nth tool 110-n that facilitate manipulation of XR objects in the XR environment 106, e.g., to undergo one or more animations. For example, in some implementations, the tools 110 include one or more animation controllers that provide one or more animations for an XR object. In some implementations, the tools 110 include accessories for XR objects. For example, in some implementations, the first tool 110-1 includes a jet pack accessory that allows an XR object to fly.

For example, in some implementations, the first tool 110-1 is implemented as an animation controller that provides a running animation for the boy action figure representation 108a and/or the girl action figure representation 108b. In some implementations, the second tool 110-2 is implemented as an animation controller that provides a flying animation for the girl action figure representation 108b. In some implementations, the nth tool 110-n is implemented as an animation controller that provides a hovering animation for the drone representation 108d. In some implementations, the tools 110 provide cyclic animations for actions that occur in cycles and/or tend to be repetitive (e.g., running, jumping, etc.). In some implementations, the tools 110 provide acyclic animations or non-cyclic animations for actions that tend not to be cyclic.

In various implementations, each of the tools 110 is associated with respective animation parameters. For example, in some implementations, the first tool 110-1 for the running animation is associated with a running speed parameter and/or a running style parameter. In some implementations, the second tool 110-2 for the flying animation is associated with a flying speed parameter and/or a flying height parameter. In some implementations, the tools 110 determine values for the respective animation parameters. For example, the first tool 110-1 for the running animation determines a value for the running speed parameter and/or a value for the running style parameter. Similarly, in some implementations, the second tool 110-2 for the flying animation determines a value for the flying speed parameter and/or a value for the flying height parameter.

In some implementations, the controller 102 and/or the electronic device 103 include a motion controller 120 that generates motion data for each of the animations provided by the tools 110. In various implementations, the motion controller 120 determines joint movements for various joints of the boy action figure representation 108a and/or the girl action figure representation 108b in order to provide an appearance that the boy action figure representation 108a and/or the girl action figure representation 108b are undergoing one of the animations provided by the tools 110. In some implementations, the motion controller 120 determines the joint movements based on the values for the animation parameters generated by the tools 110. As such, the joint movements determined by the motion controller 120 are a function of the values for the animation parameters generated by the tools 110. In various implementations, the motion controller 120 determines the joint movements by generating joint movement values (e.g., joint position values and/or joint angle values).

In some implementations, the motion controller 120 receives a response characteristic that is to be exhibited by an XR object. For example, the motion controller 120 may receive the response characteristic from a memory location, such as an animation pipeline. The response characteristic may be an action that the XR object is to be manipulated (e.g., animated) to appear to perform. In some implementations, the response characteristic indicates a target manipulation for the XR object. In some implementations, the response characteristic includes a response to a physical force, such as gravity.

In some implementations, the motion controller 120 selects a tool 110 that allows the XR object to be manipulated (e.g., to undergo an animation) to exhibit the response characteristic in the XR environment. For example, if the motion controller 120 receives a flying action response characteristic, the motion controller 120 may select the second tool 110-2 that provides a flying animation.

In some implementations, the selected tool 110 includes an animation clip that corresponds to the response characteristic. For example, if the motion controller 120 receives a flying action response characteristic, the motion controller 120 may select a tool 110 that includes a flying animation clip.

In some implementations, the selected tool 110 includes an accessory that corresponds to the response characteristic. For example, if the motion controller 120 receives a flying action response characteristic, the motion controller 120 may select a tool 110 that includes an accessory with a flying feature, such as a jet pack.

In some implementations, the selected tool 110 includes a rig that includes multiple tools applied to the skeleton of the XR object. The rig may be associated with a function that corresponds to the response characteristic. For example, if the motion controller 120 receives a flying action response characteristic, the rig may be implemented as, for example, an airplane rig that enables the flying response characteristic.

In some implementations, the motion controller 120 associates the selected tool 110 with a skeleton of the XR object. For example, the selected tool 110 may be applied to the skeleton of the XR object. In some implementations, after the selected tool 110 is associated with the skeleton of the XR object, a manipulation of the XR object within the XR environment 106 in accordance with the response characteristic is displayed. For example, the XR object may be displayed as flying. The selected tool 110 may be disassociated from the skeleton of the XR object after the manipulation of the XR object is displayed. In some implementations, the selected tool 110 includes attachment points that are anchored to joints of the XR object. In some implementations, applying the selected tool 110 to the skeleton of the XR object includes mapping portions of the selected tool 110 to respective portions of the skeleton of the XR object. For example, if the selected tool 110 is an airplane rig and the XR object is a graphical person, applying the airplane rig to the graphical person includes mapping wings of the airplane rig to arms of the graphical person in order to enable the graphical person to perform a flying action that is within a similarity threshold of an airplane flying.

Figure 1:
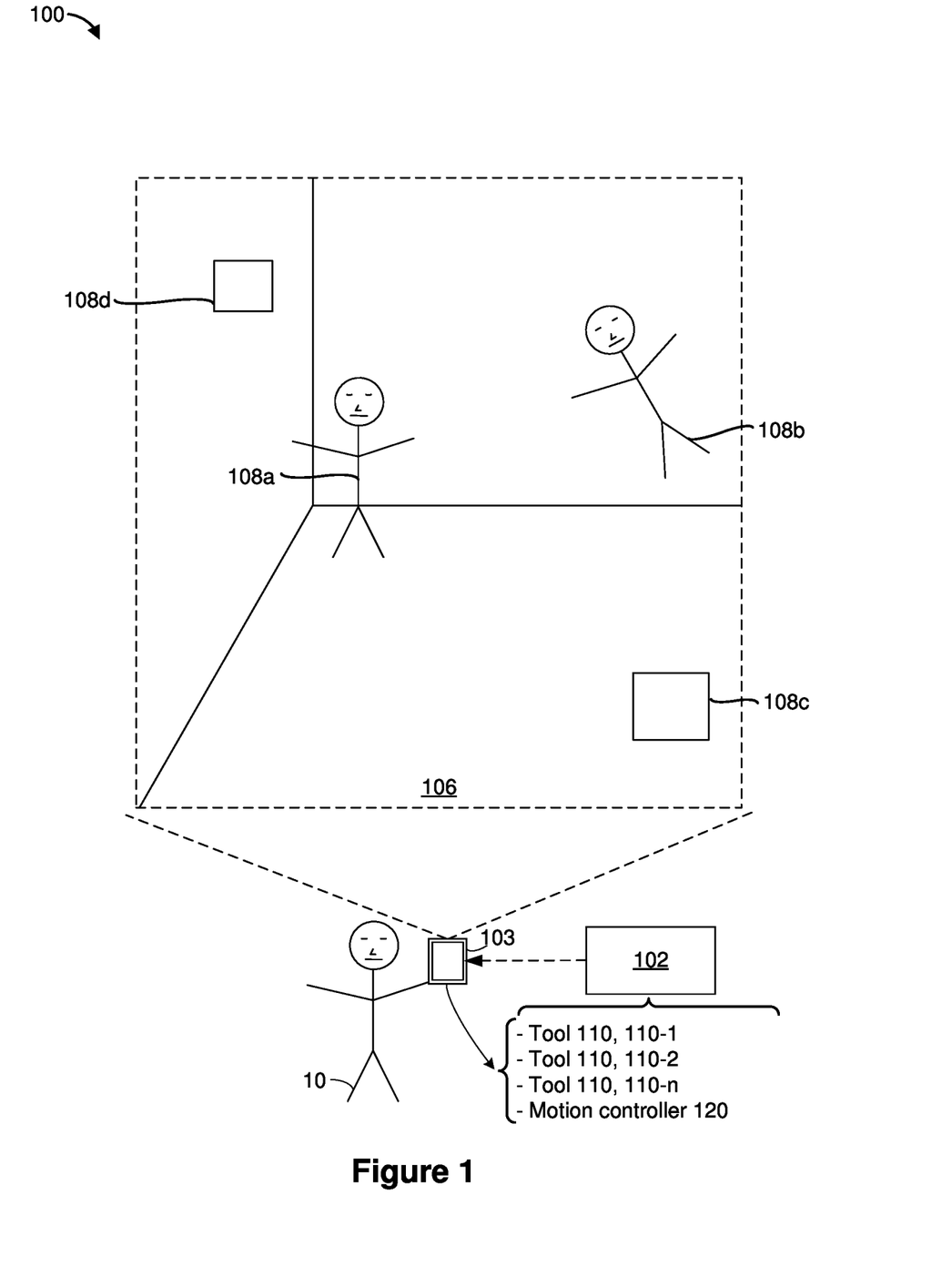
FIG. 1 depicts exemplary systems for use in various graphics technologies.
Figure 2:
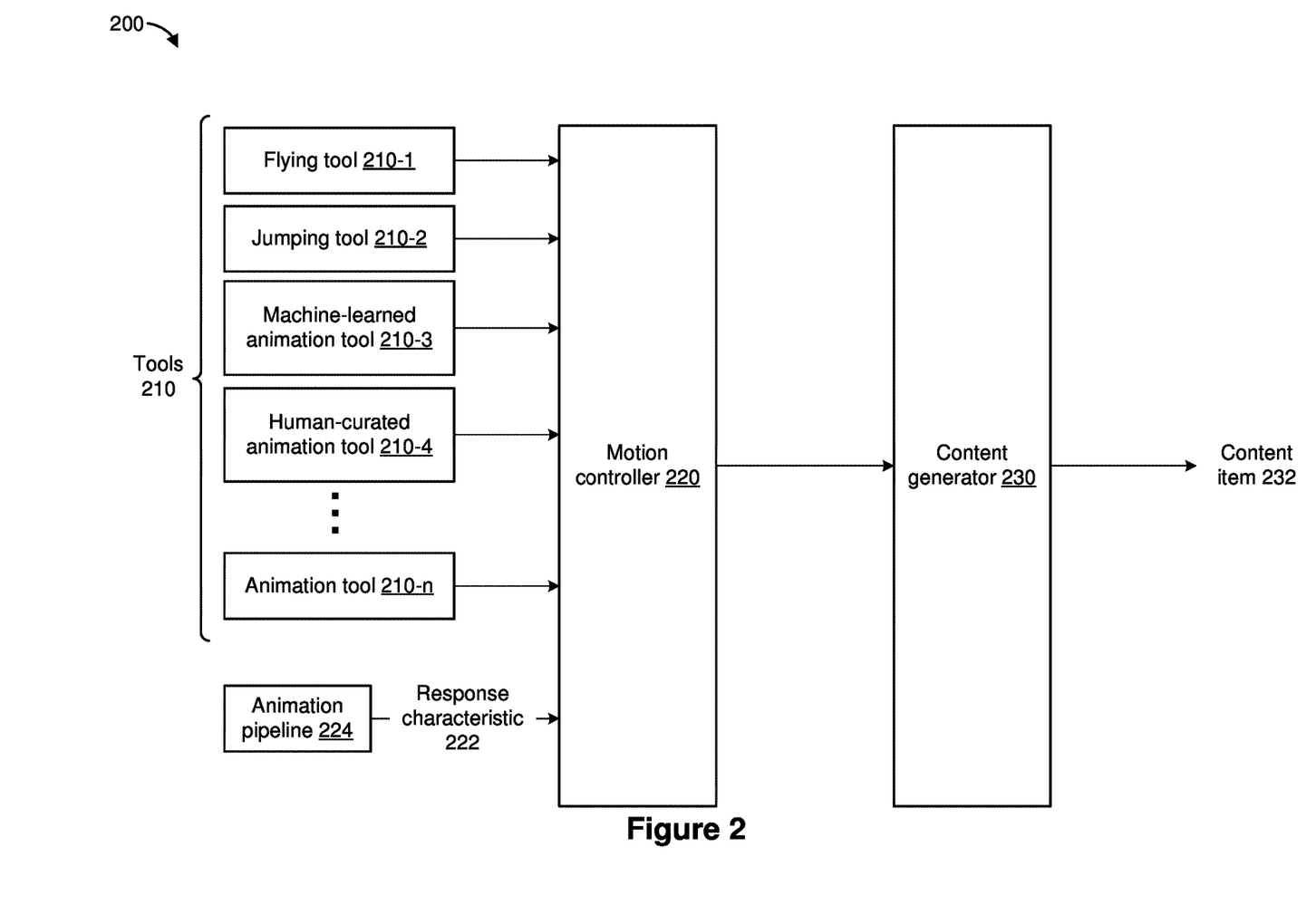
FIG. 2 illustrates an example system that displays a manipulation of an object according to various implementations.

FIG. 2 illustrates an example system 200 that displays a manipulation of an XR object (e.g., the boy action figure representation 108a, the girl action figure representation 108b, the robot representation 108c, and/or the drone representation 108d of FIG. 1) in an XR environment according to various implementations. In some implementations, the system 200 resides at the controller 102 and/or the electronic device 103 shown in FIG. 1, respectively. In various implementations, the system 200 includes tools 210 and a motion controller 220. In some implementations, the tools 210 and the motion controller 220 implement the tools 110 and the motion controller 120, respectively, shown in FIG. 1.

In some implementations, the motion controller 220 obtains a response characteristic for an XR object while the XR object is displayed in an XR environment. The motion controller 220 may obtain the response characteristic 222 from a memory location, such as an animation pipeline 224. The response characteristic 222 describes a response that is to be exhibited by the XR object. In some implementations, the response characteristic 222 is an action that the XR object is to be animated as appearing to perform. The action may indicate a target manipulation for the XR object. For example, the response characteristic 222 may be a flying or jumping action and may indicate a flying or jumping manipulation that the XR object is to undergo. In some implementations, the response characteristic 222 is a response to a physical force, such as gravity. For example, the response characteristic 222 may indicate a falling manipulation that the XR object is to undergo.

In some implementations, the motion controller 220 selects a tool 210 that allows the XR object to be manipulated, e.g., animated, to exhibit the response characteristic 222 in the XR environment. In some implementations, the motion controller 220 selects the tool 210 from a plurality of tools 210. For example, in the example of FIG. 2, the tools 210 include a flying tool 210-1 that provides a flying animation. In some implementations, the tools 210 include a jumping tool 210-2 that provides a jumping animation. In some implementations, the tools 210 include a machine-learned animation tool 210-3 that provides a machine-learned animation. In some implementations, a machine-learned animation refers to an animation that is generated by identifying and mimicking a cyclic movement in source material (e.g., a movie, a television show, a book, etc.). In some implementations, the tools 210 include a human-curated animation tool 210-4 that provides a human-curated animation. In some implementations, a human-curated animation refers to an animation that is specified by a human (e.g., the user 10 shown in FIG. 1). In some implementations, the tools 210 include an nth animation tool 210-n that provides an nth animation.

In various implementations, the tools 210 allow the XR object to be manipulated to appear to perform an action. For example, one or more of the tools 210 may include an animation clip that corresponds to the action. In some implementations, the flying tool 210-1 includes a flying animation clip that causes the XR object to appear to fly. In some implementations, multiple clips may be composited together (e.g., in a sequence or in a hybrid combination) to allow the XR object to be manipulated to appear to perform a complex action. For example, the motion controller 220 may composite a walking animation clip and a jumping animation clip together to allow the XR object to be manipulated to perform a complex action that includes walking and jumping at the same time. In some implementations, an animation clip may be replicated to create a continuous motion. For example, the motion controller 220 may replicate multiple instances of a walking animation clip to allow the XR object to be manipulated to appear to perform a continuous walking action.

In some implementations, one or more of the tools 210 includes a rig that is associated with a function that corresponds to an action. For example, to allow the XR object to be manipulated to appear to fly, the flying tool 210-1 may include an airplane rig that enables the flying action. The airplane rig may include, for example, multiple tools that are applied in a sequence, e.g., a defined sequence, to the skeleton of the XR object. In some implementations, the rig is hierarchical, e.g., the tools included in the rig may be organized in a hierarchy. In some implementations, the rig may be selected based on the response characteristic 222. For example, the tools 210 may include multiple rigs, and the motion controller 220 may select one or more of the rigs to apply to the skeleton of the XR object based on a degree of similarity between the response characteristic 222 and the response characteristics enabled by the rigs.

In some implementations, one or more of the tools 210 includes an accessory with a feature that corresponds to an action. For example, to allow the XR object to be manipulated to appear to fly, the flying tool 210-1 may include a jet pack that has a flying feature. In some implementations, the accessory may be selected based on the response characteristic 222. For example, the tools 210 may include multiple accessories (e.g., a jet pack, a pair of wings, a wingsuit, a parachute, a grappling hook, a pogo stick, etc.). The motion controller 220 may select one or more of the accessories (e.g., the jet pack and/or the pair of wings) based on a degree of similarity between the response characteristic 222 (e.g., flying) and the response characteristics enabled by the accessories (e.g., flying, gliding, grappling, and/or jumping).

In various implementations, the motion controller 220 associates the selected tool 210 with a skeleton of the XR object. The motion controller 220 may associate the selected tool 210 with the entire skeleton of the XR object or with a portion of the skeleton. For example, if the selected tool 210 includes a jet pack accessory, the motion controller 220 may associate the jet pack accessory with a back portion of the skeleton of the XR object.

In some implementations, the motion controller 220 associates the selected tool 210 with the skeleton of the XR object based on the orientation of the device. For example, if the device is in a portrait orientation, the motion controller 220 may associate the selected tool 210 with a face portion of the skeleton of the XR object. On the other hand, if the device is in a landscape orientation, the motion controller 220 may associate the selected tool 210 with a body portion of the skeleton.

In some implementations, the selected tool 210 changes a manipulation range of the XR object to include the target manipulation indicated by the response characteristic. For example, the selected tool 210 may expand or shift the manipulation range of the XR object to include a flying manipulation. In some implementations, for example, the selected tool 210 removes or modifies the effect of gravity on the XR object.

In various implementations, the system 200 displays a manipulation of the XR object within the XR environment in accordance with the response characteristic 222 after associating the selected tool 210 with the skeleton of the XR object. For example, after associating the flying tool 210-1 with the skeleton of the XR object, the system 200 may display the XR object flying within the XR environment. In some implementations, the displayed manipulation is dependent on one or more characteristics of the tool that is associated with the skeleton of the XR object. For example, a flying manipulation may be displayed in one way if the flying tool 210-1 includes a jet pack accessory but may be displayed in a different way if the flying tool 210-1 includes an airplane rig.

In some implementations, the displayed manipulation is dependent on a portion of the skeleton with which the tool is associated. For example, a jumping manipulation may be displayed in one way if the jumping tool 210-2 is associated with a waist portion of the skeleton but may be displayed in a different way if the jumping tool 210-2 is associated with a foot portion of the skeleton. In some implementations, associating the selected tool 210 with different parts of the skeleton results in different joints being involved in the manipulation of the XR object.

In some implementations, the motion controller 220 provides the XR object and the tool associated with the skeleton of the XR object to an XR content generator 230. The XR content generator 230 may generate an XR content item 232 including the XR environment with the XR object manipulated to exhibit the response characteristic 222 and/or other XR objects. The XR content item 232 may be displayed on the device in which the motion controller 220 is implemented and/or may be sent to another device.

In some implementations, the motion controller 220 disassociates (e.g., disengages) the selected tool 210 from the skeleton of the XR object after the manipulation of the XR object is displayed. For example, after a flying manipulation is displayed, the flying tool 210-1 may be disassociated from the skeleton of the XR object. The XR object may be affected by gravity in the XR environment after the flying tool 210-1 is disassociated from the skeleton of the XR object.

Figure 3:
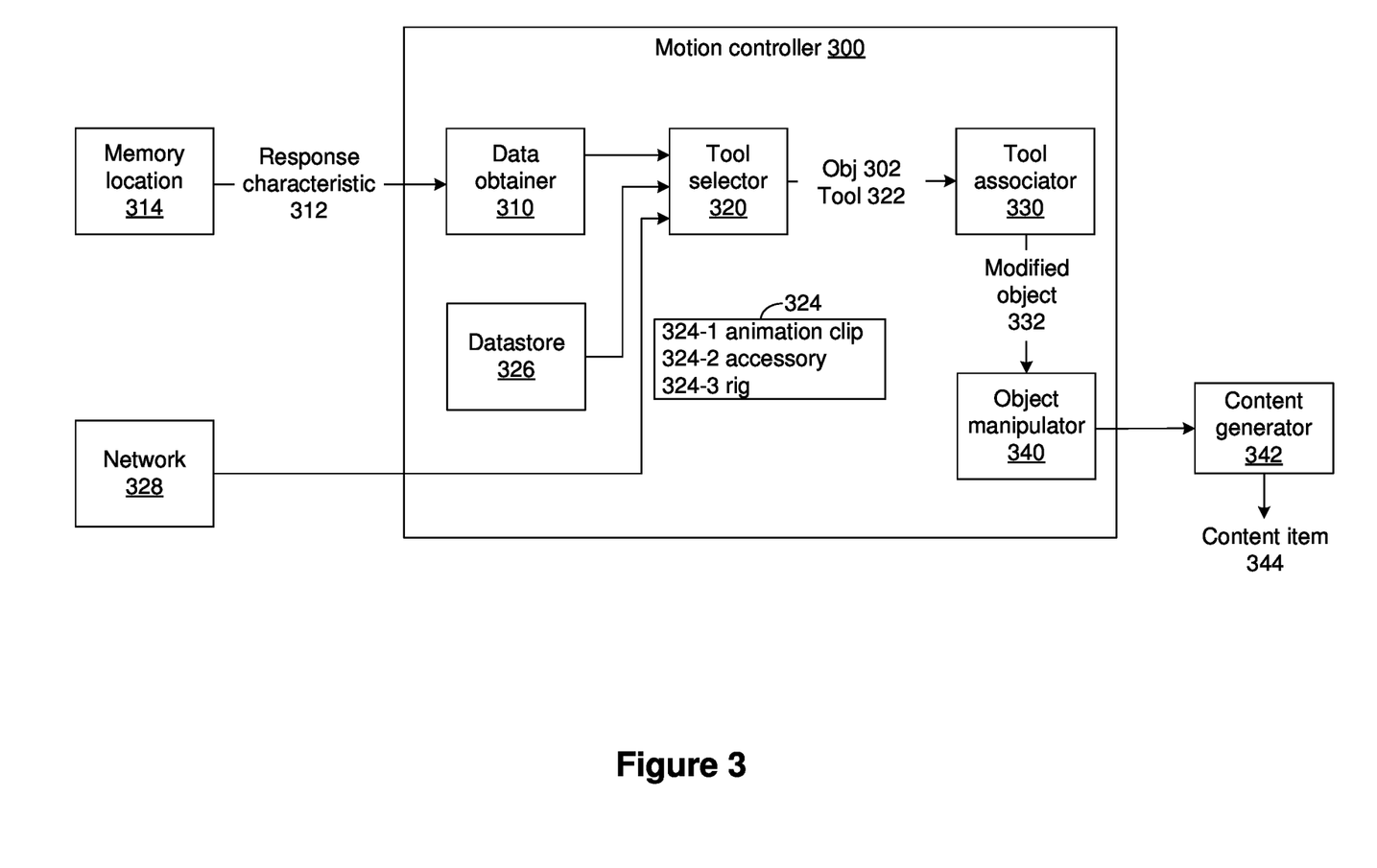
FIG. 3 is a block diagram of an example motion controller in accordance with some implementations.

FIG. 3 is a block diagram of an example motion controller 300 in accordance with some implementations. In some implementations, the motion controller 300 implements the motion controller 120 shown in FIG. 1 and/or the motion controller 220 shown in FIG. 2. In various implementations, the motion controller 300 obtains (e.g., receives) a response characteristic from a memory location while displaying an XR object 302 in an XR environment (e.g., the boy action figure representation 108a, the girl action figure representation 108b, the robot representation 108c and/or the drone representation 108d shown in FIG. 1). In various implementations, the motion controller 300 selects a tool that allows the XR object 302 to be manipulated (e.g., animated) to exhibit the response characteristic 312 in the XR environment. The motion controller 300 associates (e.g., engages) the selected tool with a skeleton of the XR object 302 and displays a manipulation of the XR object 302 within the XR environment in accordance with the response characteristic.

In some implementations, a data obtainer 310 obtains (e.g., receives) a response characteristic 312 from a memory location 314, such as an animation pipeline, while displaying the XR object 302 in the XR environment. The response characteristic 312 characterizes a response that the XR object 302 is to be manipulated (e.g., animated) to display. In some implementations, the response characteristic 312 is an action that the XR object 302 is to be animated as appearing to perform, such as flying. The action may indicate a target manipulation for the XR object 302, such as a flying manipulation. In some implementations, the response characteristic 312 is a response to a physical force, such as gravity or melting.

In some implementations, a tool selector 320 selects a tool 322 that allows the XR object 302 to be manipulated, e.g., animated, to exhibit the response characteristic in the XR environment. In some implementations, the tool selector 320 selects the tool 322 from a plurality of candidate tools 324. In some implementations, the tool selector 320 selects the tool 322 from a plurality of candidate tools 324 stored in a data store 326. In some implementations, the tool selector 320 selects the tool 322 from a plurality of candidate tools 324 available via a network 328, such as a local area network (LAN), a wide area network (WAN), an intranet, or the Internet.

In some implementations, multiple candidate tools 324 are available to facilitate manipulation of the XR object 302 to exhibit the response characteristic in the XR environment. For example, in a discovery process, the tool selector 320 may identify a first candidate tool 324-1 that provides a flying animation clip that causes the XR object 302 to appear to fly. In some implementations, multiple clips may be composited together (e.g., in a sequence or in a hybrid combination) to allow the XR object 302 to be manipulated to appear to perform a complex action. The tool selector 320 may identify a second candidate tool 324-2 that includes an accessory with a feature that corresponds to a flying action, such as a jet pack or a pair of wings. The tool selector 320 may identify a third candidate tool 324-3 that includes a rig that is associated with a function that corresponds to a flying action, such as an airplane rig that enables the flying action. The airplane rig may include, for example, multiple tools that are applied in a sequence, e.g., a defined sequence, to the skeleton of the XR object 302.

In some implementations, if multiple candidate tools 324 are available to facilitate manipulation of the XR object 302 to exhibit the response characteristic, the tool selector 320 selects a particular candidate tool 324 based on a degree of similarity between a response characteristic enabled by a candidate tool 324 and the intended response characteristic received by the data obtainer 310. For example, the tool selector 320 may select a candidate tool 324 that enables a flying response characteristic over a candidate tool 324 that enables a gliding response characteristic. In some implementations, the tool selector 320 selects the tool 322 from the candidate tools 324 based on a characteristic of the XR object 302. For example, if the XR object 302 represents a science fiction character, the tool selector 320 may select a candidate tool 324 that includes a jet pack accessory. On the other hand, if the XR object 302 represents a fantasy character, the tool selector 320 may select a candidate tool 324 that includes a wings accessory.

In some implementations, if no tool is available to facilitate manipulation of the XR object 302 to exhibit the response characteristic, the tool selector 320 selects the tool 322 from the candidate tools 324 based on a degree of similarity between a response characteristic enabled by a candidate tool 324 and a target response characteristic received by the data obtainer 310. For example, if no candidate tool 324 is available to enable a flying response characteristic, the tool selector 320 may select a candidate tool 324 that enables a gliding response characteristic. In some implementations, multiple tools are combined, e.g., composited, to enable a response characteristic for which a single candidate tool 324 may not be available. For example, the tool selector 320 may composite a first candidate tool 324-1 that includes a walking animation clip with a second candidate tool 324-2 that includes a jumping animation clip to enable manipulating the XR object 302 to perform a complex motion involving walking and jumping simultaneously.

In some implementations, the tool selector 320 selects multiple instances of the tool 322, e.g., to manipulate the XR object 302 to perform a continuous motion. For example, if the intended response characteristic is a continuous walking motion, the tool selector 320 may replicate multiple instances of a walking animation clip to enable the continuous walking motion.

In some implementations, the tool selector 320 selects a rig that is associated with a function that corresponds to an action. For example, if the intended response characteristic is a flying action, the tool selector 320 may select an airplane rig that enables the flying action. The airplane rig may include, for example, multiple tools that are applied in a sequence, e.g., a defined sequence, to the skeleton of the XR object 302. In some implementations, the rig is hierarchical, e.g., the tools included in the rig may be organized in a hierarchy. In some implementations, the tool selector 320 selects the rig based on a target response characteristic. For example, the data store 326 may include multiple rigs, and the tool selector 320 may select one or more of the rigs to apply to the skeleton of the XR object 302 based on a degree of similarity between the target response characteristic and the response characteristics enabled by the rigs.

In some implementations, a tool associator 330 associates (e.g., engages) the selected tool 322 with the skeleton of the XR object 302, creating a modified XR object 332. The tool associator 330 may associate the selected tool 322 with the entire skeleton of the XR object 302 or with a portion of the skeleton. For example, if the selected tool 322 includes a jet pack accessory, the tool associator 330 may associate the jet pack accessory with a back portion of the skeleton of the XR object 302.

In some implementations, one or more characteristics of the modified XR object 332 may be dependent on a location on the skeleton with which the tool 322 is associated. For example, if the tool 322 enables a jumping response characteristic, the modified XR object 332 may behave differently if the tool 322 is associated with a knee portion of the skeleton as compared with a foot portion of the skeleton. Further, the modified XR object 332 may behave differently when the tool 322 is associated with a particular portion of the skeleton than when the tool 322 is associated with the entire skeleton.

In some implementations, the tool associator 330 associates the selected tool 322 with the skeleton of the XR object 302 based on the orientation of the device. For example, if the device is in a portrait orientation, the tool associator 330 may associate the selected tool 322 with a face portion of the skeleton of the XR object 302. On the other hand, if the device is in a landscape orientation, the tool associator 330 may associate the selected tool 322 with a body portion of the skeleton.

In some implementations, the selected tool 322 changes a manipulation range of the XR object 302 to include the target manipulation indicated by the response characteristic. For example, the selected tool 322 may expand or shift the manipulation range of the XR object 302 to include a flying manipulation. In some implementations, for example, the selected tool 322 removes or modifies the effect of gravity on the XR object 302.

In some implementations, the tool associator 330 disassociates the tool 322 from the skeleton of the XR object 302 after the manipulation of the XR object 302 is displayed. For example, after a flying manipulation is displayed, the tool 322 may be disassociated from the skeleton of the XR object 302. The XR object 302 may be affected by gravity in the XR environment after the tool 322 is disassociated from the skeleton of the XR object 302.

In some implementations, an object manipulator 340 displays a manipulation of the XR object 302 within the XR environment in accordance with the response characteristic after associating the tool 322 with the skeleton of the XR object 302. For example, after associating the tool 322 with the skeleton of the XR object 302, the object manipulator 340 may display the XR object 302 flying within the XR environment. In some implementations, the object manipulator 340 provides the modified XR object 332 to an XR content generator 342. The XR content generator 342 may generate an XR content item 344 including the XR environment with the modified XR object 332 manipulated to exhibit the response characteristic and/or other XR objects. The XR content item 344 may be displayed on the device in which the motion controller 300 is implemented and/or may be sent to another device.

In some implementations, the displayed manipulation is dependent on one or more characteristics of the tool 322. For example, a flying manipulation may be displayed in one way if the tool 322 includes a jet pack accessory but may be displayed in a different way if the tool 322 includes an airplane rig.

In some implementations, the displayed manipulation is dependent on a portion of the skeleton with which the tool 322 is associated. For example, a jumping manipulation may be displayed in one way if the tool 322 is associated with a waist portion of the skeleton but may be displayed in a different way if the tool 322 is associated with a foot portion of the skeleton. In some implementations, associating the tool 322 with different parts of the skeleton results in different joints being involved in the manipulation of the XR object 302.

Figure 4A:
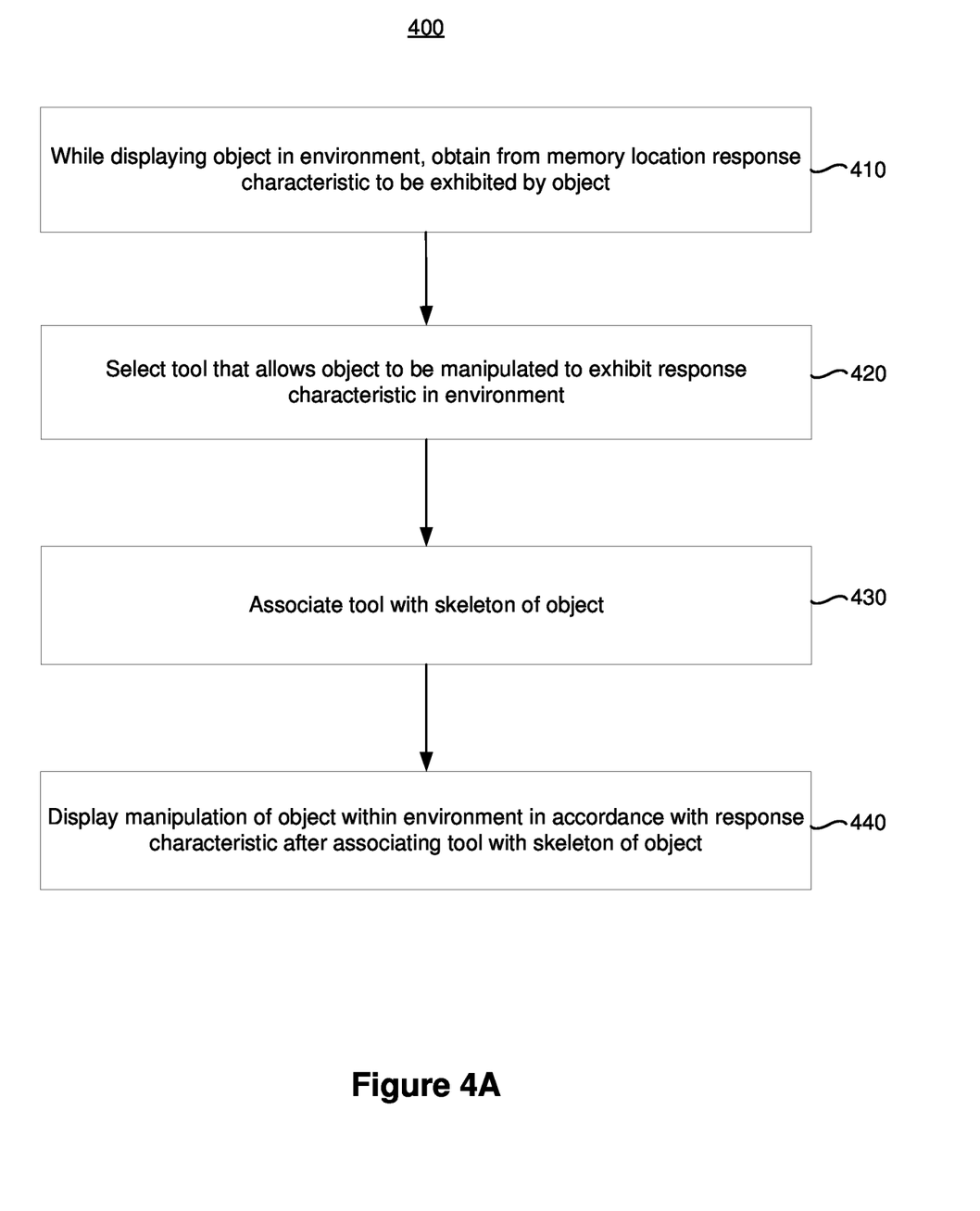
FIGS. 4A-4C are flowchart representations of a method for selectively applying a tool to a skeleton of an object in accordance with some implementations.
Figure 4B:
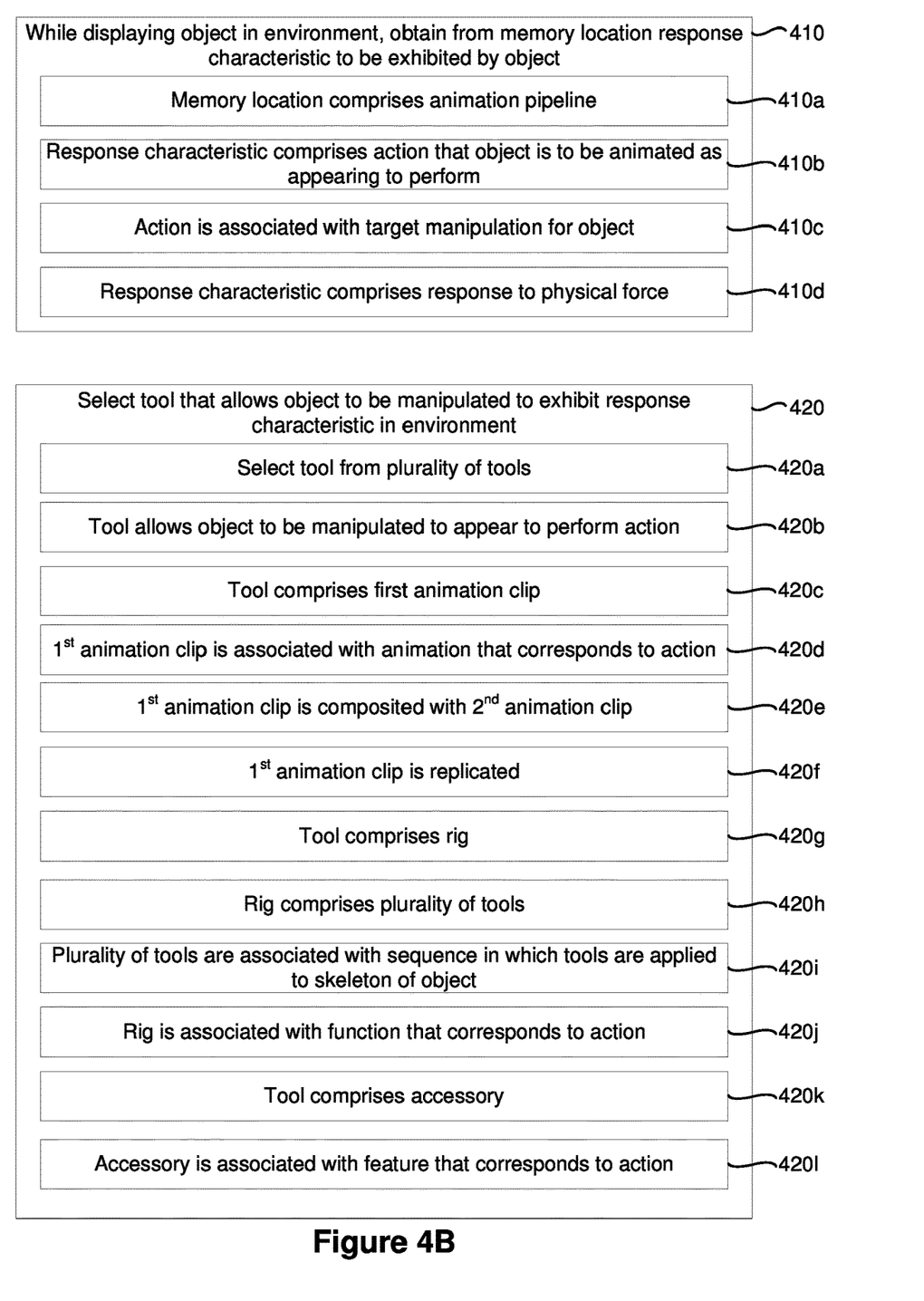
Figure 4C:
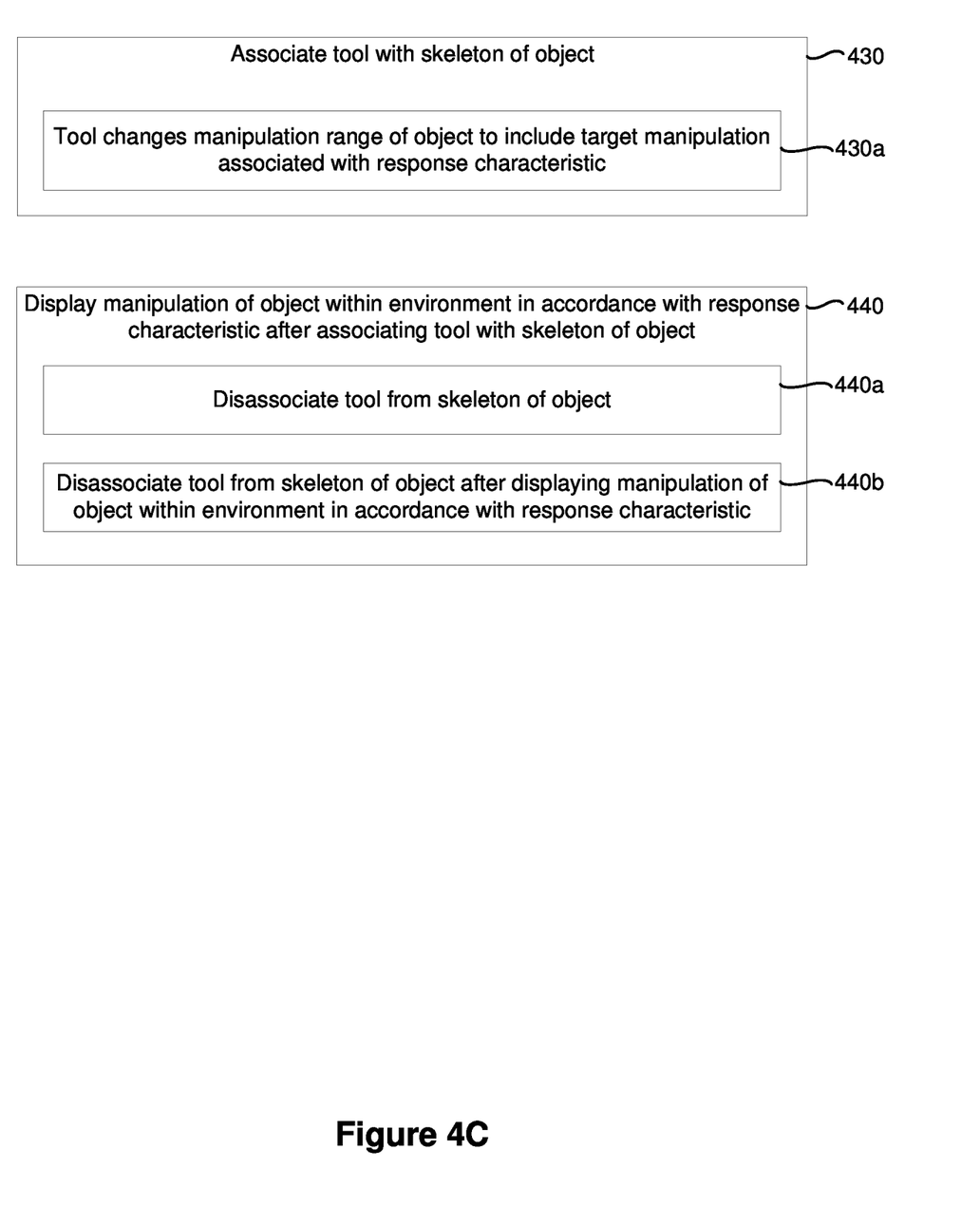

FIGS. 4A-4C are a flowchart representation of a method 400 for selectively applying a tool and/or a rig to a skeleton of an extended reality (XR) object based on an upcoming motion in accordance with some implementations. In various implementations, the method 400 is performed by a device (e.g., the system 200 shown in FIG. 2 and/or the motion controller 300 shown in FIG. 3). In some implementations, the method 400 is performed by processing logic, including hardware, firmware, software, or a combination thereof. In some implementations, the method 400 is performed by a processor executing code stored in a non-transitory computer-readable medium (e.g., a memory).

Briefly, in various implementations, the method 400 includes obtaining, from a memory location, a response characteristic to be exhibited by an XR object while displaying the XR object in an XR environment, selecting a tool that allows the XR object to be manipulated to exhibit the response characteristic in the XR environment, associating the tool with a skeleton of the XR object, and displaying a manipulation of the XR object within the XR environment in accordance with the response characteristic after associating the tool with the skeleton of the XR object.

Referring to FIG. 4A, as represented by block 410, in various implementations, the method 400 includes obtaining a response characteristic to be exhibited by the XR object from a memory location while displaying the XR object in the XR environment. Referring to FIG. 4B, as represented by block 410a, the memory location may be or may include an animation pipeline.

In some implementations, as represented by block 410b, the response characteristic may include an action that the XR object is to be animated as appearing to perform. In some implementations, as represented by block 410c, the action may be associated with a target manipulation for the XR object. For example, the response characteristic may be a flying or jumping action and may indicate a flying or jumping manipulation that the XR object is to undergo. In some implementations, as represented by block 410d, the response characteristic is a response to a physical force, such as gravity. For example, the response characteristic may indicate a falling manipulation that the XR object is to undergo.

As represented by block 420, in various implementations, the method 400 includes selecting a tool that allows the XR object to be manipulated to exhibit the response characteristic in the XR environment. In some implementations, as represented by block 420a, the tool is selected from a plurality of tools. For example, multiple candidate tools may be available to facilitate manipulation of the XR object to exhibit the response characteristic in the XR environment. In some implementations, as represented by block 420b, the tool allows the XR object to be manipulated to appear to perform an action.

As represented by block 420c, in some implementations, the tool may include a first animation clip. For example, a first candidate tool may provide a flying animation clip that enables a flying characteristic response. In some implementations, as represented by block 420d, the first animation clip is associated with an animation that corresponds to an action. For example, an animation clip may be associated with a flying animation that corresponds to a flying action.

In some implementations, as represented by block 420e, the first animation clip is composited with a second animation clip. Multiple clips may be composited together (e.g., in a sequence or in a hybrid combination) to allow the XR object to be manipulated to appear to perform a complex action. For example, a walking animation clip and a jumping animation clip may be composited to allow the XR object to be manipulated to perform a complex action that includes walking and jumping simultaneously. In some implementations, as represented by block 420f, an animation clip may be replicated to create a continuous motion. For example, multiple instances of a walking animation clip may be replicated to allow the XR object to be manipulated to appear to perform a continuous walking action.

As represented by block 420g, in some implementations, one or more of the tools includes a rig. In some implementations, the rig defines a set of functionalities. For example, a car rig defines functions associated with a car. In this example, when the car rig is applied to an XR object, the XR object functions like a car. In some implementations, a rig includes various rig attachment points. As an example, a car rig includes wheels that serve as attachment points. In some implementations, the rig is applied to an XR object by mapping one or more of the rig attachment points (e.g., wheels) to portions of a mesh of the XR object.

As represented by block 420h, in some implementations, the rig includes a plurality of tools. In some implementations, as represented by block 420i, the tools are associated with a sequence in which the tools are applied to the skeleton of the XR object.

As represented by block 420j, in some implementations, the rig is associated with a function that corresponds to an action. For example, to allow the XR object to be manipulated to appear to fly, a flying tool may include an airplane rig that enables the flying action. The airplane rig may include, for example, multiple tools that are applied in a sequence, e.g., a defined sequence, to the skeleton of the XR object. In some implementations, the rig is hierarchical, e.g., the tools included in the rig may be organized in a hierarchy. In some implementations, the rig may be selected based on a target response characteristic. For example, a set of candidate tools may include multiple rigs. One or more rigs may be selected based on a degree of similarity between the target response characteristic and the response characteristics enabled by the rigs.

In some implementations, as represented by block 420k, one or more of the tools includes an accessory. As represented by block 420l, the accessory may be associated with a feature that corresponds to an action. For example, a flying tool may include a jet pack accessory that has a flying feature corresponding to a flying action. In some implementations, the accessory may be selected based on an intended response characteristic. For example, the set of candidate tools may include multiple accessories (e.g., a jet pack, a pair of wings, a wingsuit, a parachute, a grappling hook, a pogo stick, etc.). One or more accessories may be selected based on a degree of similarity between the intended response characteristic (e.g., flying) and the response characteristics enabled by the accessories (e.g., flying, gliding, grappling, and/or jumping).

As represented by block 430, in various implementations, the method 400 includes associating the selected tool with a skeleton of the XR object. The selected tool may be associated with the entire skeleton of the XR object or with a portion of the skeleton. For example, if the selected tool includes a jet pack accessory, the selected tool may be associated with a back portion of the skeleton of the XR object.

In some implementations, the effect of the selected tool on the skeleton of the XR object is dependent on a portion of the skeleton with which the selected tool is associated. For example, associating a jumping tool with a knee portion of the skeleton may cause the knee portion of the skeleton to be prominently involved in a jumping manipulation. On the other hand, associating the jumping tool with an ankle portion of the skeleton may cause the ankle portion to be prominently involved in the jumping manipulation instead.

Referring to FIG. 4C, in some implementations, as represented by block 430a, the tool changes a manipulation range of the XR object to include a target manipulation indicated by the response characteristic. For example, the tool may expand or shift the manipulation range of the XR object to include a flying manipulation. In some implementations, for example, the tool removes or modifies the effect of gravity on the XR object.

In various implementations, as represented by block 440, the method 400 includes displaying a manipulation of the XR object within the XR environment in accordance with the response characteristic after associating the tool with the skeleton of the XR object. For example, the XR object may be displayed as flying within the XR environment. In some implementations, the XR object and the associated tool are provided to an XR content generator, which generates an XR content item including the XR environment with the XR object manipulated to exhibit the response characteristic and/or other XR objects. The XR content item may be displayed on the device in which the method 400 is implemented and/or may be sent to another device.

In some implementations, as represented by block 440a, the tool is disassociated from the skeleton of the XR object. As represented by block 440b, the tool may be disassociated from the skeleton after the manipulation of the XR object is displayed. For example, after a flying manipulation is displayed, a flying tool may be disassociated from the skeleton of the XR object. Disassociating the flying tool may allow the XR object to be subject to rules or constraints of the XR environment. For example, the XR object may be affected by gravity in the XR environment after the tool is disassociated from the skeleton of the XR object. In some implementations, after one tool is disassociated from the skeleton of the XR object, another tool may be associated with the skeleton, e.g., to enable a different response characteristic.

Figure 5:
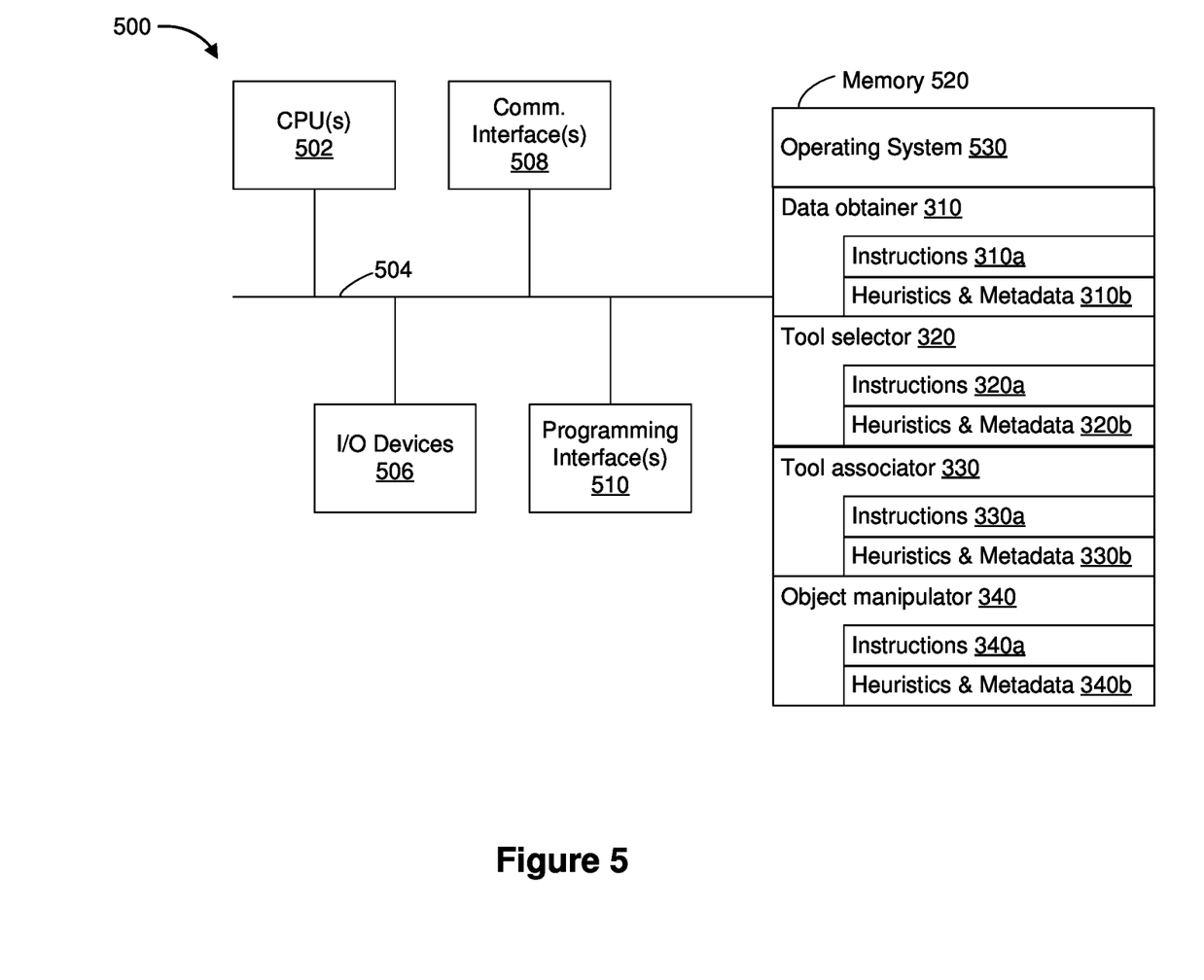
FIG. 5 is a block diagram of a device in accordance with some implementations.

FIG. 5 is a block diagram of a device 500 enabled with one or more components of a device (e.g., the electronic device 103 and/or the controller 102 shown in FIG. 1) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 502, one or more input/output (I/O) devices 506, one or more communication interface(s) 508, one or more programming interface(s) 510, a memory 520, and one or more communication buses 504 for interconnecting these and various other components.

In some implementations, the communication interface 508 is provided to, among other uses, establish, and maintain a metadata tunnel between a cloud-hosted network management system and at least one private network including one or more compliant devices. In some implementations, the one or more communication buses 504 include circuitry that interconnects and controls communications between system components. The memory 520 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 520 optionally includes one or more storage devices remotely located from the one or more CPUs 502. The memory 520 comprises a non-transitory computer readable storage medium.

In some implementations, the memory 520 or the non-transitory computer readable storage medium of the memory 520 stores the following programs, modules and data structures, or a subset thereof including an optional operating system 530, the data obtainer 310, the tool selector 320, the tool associator 330, and the object manipulator 340. As described herein, the data obtainer 310 may include instructions 310a and/or heuristics and metadata 310b for obtaining a response characteristic to be exhibited by an XR object in an XR environment. As described herein, the tool selector 320 may include instructions 320a and/or heuristics and metadata 320b for selecting a tool that allows the XR object to be manipulated to exhibit the response characteristic. As described herein, the tool associator 330 may include instructions 330a and/or heuristics and metadata 330b for associating the selected tool with a skeleton of the XR object. As described herein, the object manipulator 340 may include instructions 340a and/or heuristics and metadata 340b for displaying a manipulation of the XR object within the XR environment in accordance with the response characteristic after associating the tool with the skeleton of the XR object.

It will be appreciated that FIG. 5 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 5 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a non-transitory memory and one or more processors coupled with the non-transitory memory:
        while displaying an object in a computer graphics environment, obtaining from an animation pipeline an upcoming action to be exhibited by the object;
        selecting, by a motion controller, a tool based on the upcoming action in the animation pipeline that allows the object to be manipulated to exhibit the upcoming action in the computer graphics environment;
        associating, by the motion controller, the tool with a skeleton of the object; and
        displaying a manipulation of the object in the computer graphics environment in accordance with the upcoming action after associating the tool with the skeleton of the object.

2. The method of claim 1, wherein the upcoming action is associated with a target manipulation for the object.

3. The method of claim 1, wherein the upcoming action comprises a response to a physical force.

4. The method of claim 1, wherein the motion controller selects the tool from a plurality of tools.

5. The method of claim 1, wherein the tool allows the object to be manipulated to appear to perform the upcoming action.

6. The method of claim 1, wherein the tool comprises a first animation clip.

7. The method of claim 6, wherein the first animation clip is associated with an animation that corresponds to the upcoming action.

8. The method of claim 6, wherein the first animation clip is composited with a second animation clip.

9. The method of claim 6, wherein the first animation clip is replicated.

10. The method of claim 1, wherein the tool comprises a rig.

11. The method of claim 10, wherein the rig comprises a plurality of tools.

12. The method of claim 11, wherein the plurality of tools is associated with a sequence in which the tools are applied to the skeleton of the object.

13. The method of claim 10, wherein the rig is associated with a function that corresponds to the upcoming action.

14. The method of claim 1, wherein the tool comprises an accessory.

15. The method of claim 14, wherein the accessory is associated with a feature that corresponds to the upcoming action.

16. The method of claim 1, wherein the tool changes a manipulation range of the object to include a target manipulation associated with the upcoming action.

17. A device comprising:
one or more processors;
a non-transitory memory; and
one or more programs stored in the non-transitory memory, which, when executed by the one or more processors, cause the device to:
  while displaying an object in a computer graphics environment, obtain from an animation pipeline an upcoming action to be exhibited by the object;
  select, by a motion controller, a tool based on the upcoming action in the animation pipeline that allows the object to be manipulated to exhibit the upcoming action in the computer graphics environment;
  associate, by the motion controller, the tool with a skeleton of the object; and
  display a manipulation of the object in the computer graphics environment in accordance with the upcoming action after associating the tool with the skeleton of the object.

18. The device of claim 17, wherein the upcoming action is associated with a target manipulation for the object.

19. The device of claim 17, wherein the tool allows the object to be manipulated to appear to perform the upcoming action.

20. The device of claim 17, wherein the tool comprises a first animation clip.

21. A non-transitory memory storing one or more programs, which, when executed by one or more processors of a device, cause the device to:
  while displaying an object in a computer graphics environment, obtain from an animation pipeline an upcoming action to be exhibited by the object;
  select, by a motion controller, a tool based on the upcoming action in the animation pipeline that allows the object to be manipulated to exhibit the upcoming action in the computer graphics environment;
  associate, by the motion controller, the tool with a skeleton of the object; and
  display a manipulation of the object in the computer graphics environment in accordance with the upcoming action after associating the tool with the skeleton of the object.

22. The non-transitory memory of claim 21, wherein the upcoming action comprises a response to a physical force.

23. The non-transitory memory of claim 21, wherein the motion controller selects the tool from a plurality of tools.

24. The non-transitory memory of claim 21, wherein the tool comprises a rig.

* * * * *